US011970931B2

United States Patent
Ge et al.

(10) Patent No.: US 11,970,931 B2
(45) Date of Patent: Apr. 30, 2024

(54) THROUGH TUBING CEMENT EVALUATION USING BOREHOLE RESONANCE MODE

(71) Applicant: Halliburton Energy Services, Inc., Houston, TX (US)

(72) Inventors: Yao Ge, Singapore (SG); Ho Yin Ma, Singapore (SG); Ruijia Wang, Singapore (SG); Jing Jin, Singapore (SG); Brenno Caetano Troca Cabella, Rio de Janeiro (BZ); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 588 days.

(21) Appl. No.: 17/336,155

(22) Filed: Jun. 1, 2021

(65) Prior Publication Data

US 2022/0381133 A1 Dec. 1, 2022

(51) Int. Cl.
*G01V 1/46* (2006.01)
*E21B 47/002* (2012.01)
(Continued)

(52) U.S. Cl.
CPC ........ *E21B 47/005* (2020.05); *E21B 47/0025* (2020.05); *E21B 47/007* (2020.05);
(Continued)

(58) Field of Classification Search
CPC ...... E21B 47/005; E21B 49/003; E21B 47/14; E21B 49/00; E21B 33/14; E21B 47/095;
(Continued)

(56) References Cited

U.S. PATENT DOCUMENTS

| 3,914,603 A | * | 10/1975 | Paap | ..................... G01V 5/105 |
| | | | | 250/269.2 |
| 4,709,357 A | * | 11/1987 | Maki, Jr. | ............... E21B 47/005 |
| | | | | 367/45 |

(Continued)

FOREIGN PATENT DOCUMENTS

| GB | 2592974 A | 9/2021 |
| WO | 2019018100 | 1/2019 |

(Continued)

OTHER PUBLICATIONS

"PCT Application No. PCT/US2021/072826, International Search Report and Written Opinion", Aug. 24, 2022, 11 pages.

(Continued)

*Primary Examiner* — Edwin J Toledo-Duran
(74) *Attorney, Agent, or Firm* — John Wustenberg; C. Tumey Law Group PLLC

(57) ABSTRACT

A method and system for identifying bonding between a material and tubing. The method may include disposing an acoustic logging tool in a wellbore, wherein the acoustic logging tool comprises a transmitter, a receiver, or a transceiver, broadcasting a shaped signal with the transmitter such that the shaped signal interacts with a boundary of a casing and a material and recording a result signal from the boundary with the receiver. The method may further comprise identifying a cut-off time to be applied to the result signal, transforming the result signal from a time domain to a frequency domain, selecting one or more modes sensitive to a bonding at the boundary between the casing and the material, computing a decay rate of the one or more modes that were selected based at least one or more decay curves, and converting the decay rate to a bonding log.

20 Claims, 15 Drawing Sheets

(51) Int. Cl.
  *E21B 47/005* (2012.01)
  *E21B 47/007* (2012.01)
  *E21B 47/085* (2012.01)
  *E21B 47/14* (2006.01)
  *G01V 1/00* (2006.01)
  *G01V 1/30* (2006.01)
(52) U.S. Cl.
  CPC ............ *E21B 47/085* (2020.05); *E21B 47/14* (2013.01); *G01V 1/001* (2013.01); *G01V 1/30* (2013.01); *G01V 2200/16* (2013.01)
(58) Field of Classification Search
  CPC ........ E21B 47/135; E21B 33/13; E21B 33/12; E21B 47/0025; E21B 47/007; E21B 47/085; E21B 2200/22; E21B 47/0224; G01V 1/46; G01V 1/50; G01V 1/44; G01V 1/48; G01V 2210/1429; G01V 2210/1299; G01V 1/001; G01V 1/30; G01V 2200/16; G01V 1/40; C04B 28/02; C09K 8/473; G01N 29/12
  See application file for complete search history.

(56) References Cited

U.S. PATENT DOCUMENTS

| | | | | |
|---|---|---|---|---|
| 4,783,769 | A * | 11/1988 | Holzhausen | G01V 1/50 367/35 |
| 4,896,303 | A * | 1/1990 | Leslie | G01V 1/50 702/6 |
| 5,010,527 | A * | 4/1991 | Mahrer | E21B 49/00 166/254.2 |
| 5,036,496 | A * | 7/1991 | Rutledge | G01V 1/50 181/105 |
| 5,216,638 | A * | 6/1993 | Wright | E21B 47/005 702/6 |
| 5,544,127 | A * | 8/1996 | Winkler | G01V 1/303 367/27 |
| 5,763,773 | A * | 6/1998 | Birchak | E21B 47/005 73/152.58 |
| 5,859,811 | A * | 1/1999 | Miller | G01V 1/48 367/25 |
| 5,881,310 | A * | 3/1999 | Airhart | G01V 3/20 710/3 |
| 5,924,499 | A * | 7/1999 | Birchak | E21B 47/20 175/50 |
| 6,041,861 | A * | 3/2000 | Mandal | E21B 47/005 166/253.1 |
| 7,302,849 | B2 * | 12/2007 | Segal | G01V 1/44 73/598 |
| 7,681,450 | B2 * | 3/2010 | Bolshakov | E21B 47/005 181/102 |
| 8,270,248 | B2 * | 9/2012 | Hurst | G01V 1/46 367/13 |
| 10,253,615 | B2 * | 4/2019 | Hunter | G01N 29/07 |
| 10,705,056 | B2 * | 7/2020 | Lei | E21B 49/00 |
| 10,858,933 | B2 * | 12/2020 | Bose | G01V 1/44 |
| 2004/0119471 | A1 * | 6/2004 | Blanz | G01R 33/62 324/303 |
| 2006/0233048 | A1 * | 10/2006 | Froelich | E21B 47/005 367/35 |
| 2007/0019506 | A1 * | 1/2007 | Mandal | G01N 29/11 381/113 |
| 2007/0070810 | A1 * | 3/2007 | Hurst | G01V 1/46 367/35 |
| 2007/0140055 | A1 * | 6/2007 | Tello | G01V 1/44 367/25 |
| 2007/0206439 | A1 * | 9/2007 | Barolak | E21B 47/005 367/35 |
| 2008/0112262 | A1 * | 5/2008 | Tang | G01B 17/02 367/35 |
| 2009/0213689 | A1 * | 8/2009 | Tello | E21B 47/005 367/35 |
| 2010/0126718 | A1 * | 5/2010 | Lilley | E21B 37/00 166/253.1 |
| 2011/0080805 | A1 * | 4/2011 | Vu | G01V 1/46 367/32 |
| 2011/0261647 | A1 * | 10/2011 | Tabarovsky | G01V 1/44 367/35 |
| 2012/0176862 | A1 * | 7/2012 | D'Angelo | E21B 47/107 367/35 |
| 2013/0021874 | A1 * | 1/2013 | Hartog | G01V 1/226 367/31 |
| 2013/0289881 | A1 * | 10/2013 | Sinha | G01V 1/306 702/11 |
| 2013/0342077 | A1 * | 12/2013 | Lautzenhiser | H10N 30/80 310/326 |
| 2014/0056111 | A1 * | 2/2014 | Vu | E21B 47/005 367/180 |
| 2015/0034311 | A1 * | 2/2015 | Tunget | E21B 47/12 166/250.14 |
| 2015/0168581 | A1 * | 6/2015 | Izuhara | E21B 47/005 702/9 |
| 2015/0177404 | A1 * | 6/2015 | Pabon | G01V 1/46 367/28 |
| 2015/0198032 | A1 * | 7/2015 | Sinha | E21B 47/107 166/250.01 |
| 2015/0198732 | A1 * | 7/2015 | Zeroug | E21B 47/005 367/35 |
| 2015/0218930 | A1 * | 8/2015 | Zeroug | E21B 47/005 367/30 |
| 2015/0219780 | A1 * | 8/2015 | Zeroug | E21B 49/003 702/6 |
| 2015/0338378 | A1 * | 11/2015 | Lu | E21B 47/14 73/152.16 |
| 2015/0378040 | A1 * | 12/2015 | Mandal | G01V 1/50 367/35 |
| 2016/0018549 | A1 * | 1/2016 | Tracadas | E21B 47/005 367/25 |
| 2016/0033664 | A1 * | 2/2016 | Cheng | E21B 47/107 73/152.57 |
| 2016/0209539 | A1 * | 7/2016 | Le Calvez | G01V 1/50 |
| 2017/0058660 | A1 * | 3/2017 | Hunter | G01N 29/42 |
| 2017/0114627 | A1 * | 4/2017 | Mandal | E21B 47/005 |
| 2017/0168179 | A1 * | 6/2017 | Lemarenko | E21B 47/085 |
| 2017/0199295 | A1 * | 7/2017 | Mandal | E21B 17/1078 |
| 2017/0342817 | A1 * | 11/2017 | Tello | G01V 1/50 |
| 2017/0350999 | A1 * | 12/2017 | Merciu | G01V 1/50 |
| 2018/0031723 | A1 * | 2/2018 | Przebindowska | G01V 1/50 |
| 2018/0149019 | A1 * | 5/2018 | Bose | E21B 47/005 |
| 2018/0153205 | A1 * | 6/2018 | Wu | B33Y 50/02 |
| 2018/0328163 | A1 * | 11/2018 | Hayman | E21B 47/005 |
| 2018/0334901 | A1 * | 11/2018 | Hou | G01V 1/50 |
| 2019/0018161 | A1 * | 1/2019 | Wang | G01V 1/46 |
| 2019/0018162 | A1 * | 1/2019 | Wang | G01V 1/48 |
| 2019/0025452 | A1 * | 1/2019 | Wang | E21B 49/00 |
| 2019/0145241 | A1 * | 5/2019 | Yao | E21B 47/002 348/85 |
| 2019/0204468 | A1 * | 7/2019 | Ge | G01V 3/34 |
| 2019/0211672 | A1 * | 7/2019 | Jin | G01V 1/46 |
| 2019/0293823 | A1 * | 9/2019 | Sun | G01V 1/50 |
| 2019/0376380 | A1 * | 12/2019 | Zhang | E21B 47/005 |
| 2019/0383130 | A1 * | 12/2019 | Fox | G01V 1/40 |
| 2020/0003349 | A1 | 1/2020 | Takezawa et al. | |
| 2020/0003924 | A1 * | 1/2020 | Jin | H10N 30/8554 |
| 2020/0033494 | A1 * | 1/2020 | Patterson | E21B 49/00 |
| 2020/0072036 | A1 * | 3/2020 | Wang | G01N 29/46 |
| 2020/0088901 | A1 * | 3/2020 | Quintero | E21B 47/005 |
| 2020/0116007 | A1 * | 4/2020 | Mandal | E21B 47/005 |
| 2020/0116883 | A1 * | 4/2020 | Padhi | G01V 1/305 |
| 2020/0116884 | A1 * | 4/2020 | Weng | G01V 1/305 |
| 2020/0199995 | A1 | 6/2020 | Hu et al. | |
| 2020/0378247 | A1 * | 12/2020 | Ma | E21B 49/00 |
| 2020/0400015 | A1 | 12/2020 | Ge et al. | |
| 2021/0055436 | A1 | 2/2021 | Wu et al. | |
| 2021/0102459 | A1 | 4/2021 | Ewe et al. | |
| 2021/0103069 | A1 | 4/2021 | Jin et al. | |
| 2021/0108510 | A1 | 4/2021 | Ge et al. | |
| 2021/0109241 | A1 | 4/2021 | Wang et al. | |
| 2021/0109243 | A1 | 4/2021 | Ge et al. | |

(56) References Cited

U.S. PATENT DOCUMENTS

| | | | |
|---|---|---|---|
| 2021/0123339 A1* | 4/2021 | Steel | G01V 1/46 |
| 2021/0123731 A1 | 4/2021 | Chang et al. | |
| 2021/0141115 A1 | 5/2021 | Wang et al. | |
| 2021/0246777 A1 | 8/2021 | Zhao et al. | |
| 2021/0396126 A1 | 12/2021 | Wang et al. | |
| 2022/0381133 A1 | 12/2022 | Ge et al. | |
| 2023/0175386 A1 | 6/2023 | Ge et al. | |
| 2023/0194743 A1 | 6/2023 | Wang et al. | |

FOREIGN PATENT DOCUMENTS

| | | |
|---|---|---|
| WO | 2019240952 | 12/2019 |
| WO | 2020222744 | 11/2020 |
| WO | 2023107136 | 6/2023 |

OTHER PUBLICATIONS

"PCT Application No. PCT/US2021/073046, International Search Report and Written Opinion", Sep. 7, 2022, 11 pages.

"PCT Application No. PCT/US2022/070022, International Search Report and Written Opinion", Sep. 21, 2022, 8 pages.

Wang, et al., "The Wavefield of Acoustic Logging in a Cased-hole With a Single Casing—Part I: a Monopole Tool", Geophysical Journal International, vol. 212, Oct. 12, 2017, 15 pages.

"Great Britian Search Report for Application No. 2110237.1", 3 pages, Nov. 14, 2022.

Wireline and Perforating Products and Services Catalog—Halliburton.

Great Britan Search Report for Application No. 2110237.1 dated Jan. 14, 2022.

Wireline and Perforating Products and Services Catalog—Halliburton, 2013.

"U.S. Appl. No. 17/643,259, Non-Final Office Action", Jun. 13, 2023, 6 pages.

* cited by examiner

THROUGH TUBING CEMENT EVALUATION USING BOREHOLE RESONANCE MODE

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

At the end of a well installations' life, the well installation must be plugged and abandoned. Traditional cement bond log (CBL) tool requires the production tubing to be pulled out so that the signal can directly reach casing through borehole fluid. Understanding cement bond integrity to a pipe string and/or casing string may be beneficial in determining how to plug the well installation. Moreover, the tubing is usually not centered in the casing, due to the curvature of the tubing or well inclination. Being off centered is called eccentricity, which may have a profound effect on acoustic signals. Eccentricity is further used to describe the displacement of both tubing and tool away from the casing center. Traditionally, a method applied to a centric case may not work for eccentric cases.

Through tubing cement evaluation is challenging because traditional CBL (cement bond log) tool has too little energy penetrating the tubing. The casing response is too low comparing to the overall signal, which makes it difficult to evaluate the cement property behind the casing. Moreover, tubing is often located off-centered in a casing. The severity of eccentricity could affect the signal from casing significantly, which may require multiple methods and systems to evaluate cement bonding and form a cement bonding log.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to methods for identifying cement bonding as well as materials behind a casing with an acoustic logging tool. Acoustic sensing may provide continuous in situ measurements of parameters related to cement bonding to a casing. As a result, acoustic sensing may be used in cased borehole monitoring applications. As disclosed herein, acoustic logging tools may be used to emit an acoustic signal which may travers through a pipe string to a casing. The casing may be backed by any type of material, such as the formation or cement. As described below, the acoustic logging tool may use one or more late time signals and transform the one or more late time signals into a frequency domain. The peaks in the frequency domain identify one or more resonance modes the acoustic logging tool may utilize to identify the bonding between the casing and material behind the casing. The casing-sensitive modes may be identified by their frequency responses or their mode shapes. The modes may also be identified as a monopole, dipole, quadrupole, or higher order modes. In eccentric cases, the mode shape may be asymmetrical and may be identified by its unique mode shape. Additionally, the decay rate of the energy of a specific mode may be related to the degree of cement bonding. Identifying the decay rate may help in the construction of a cement bonding log.

Figure 1:
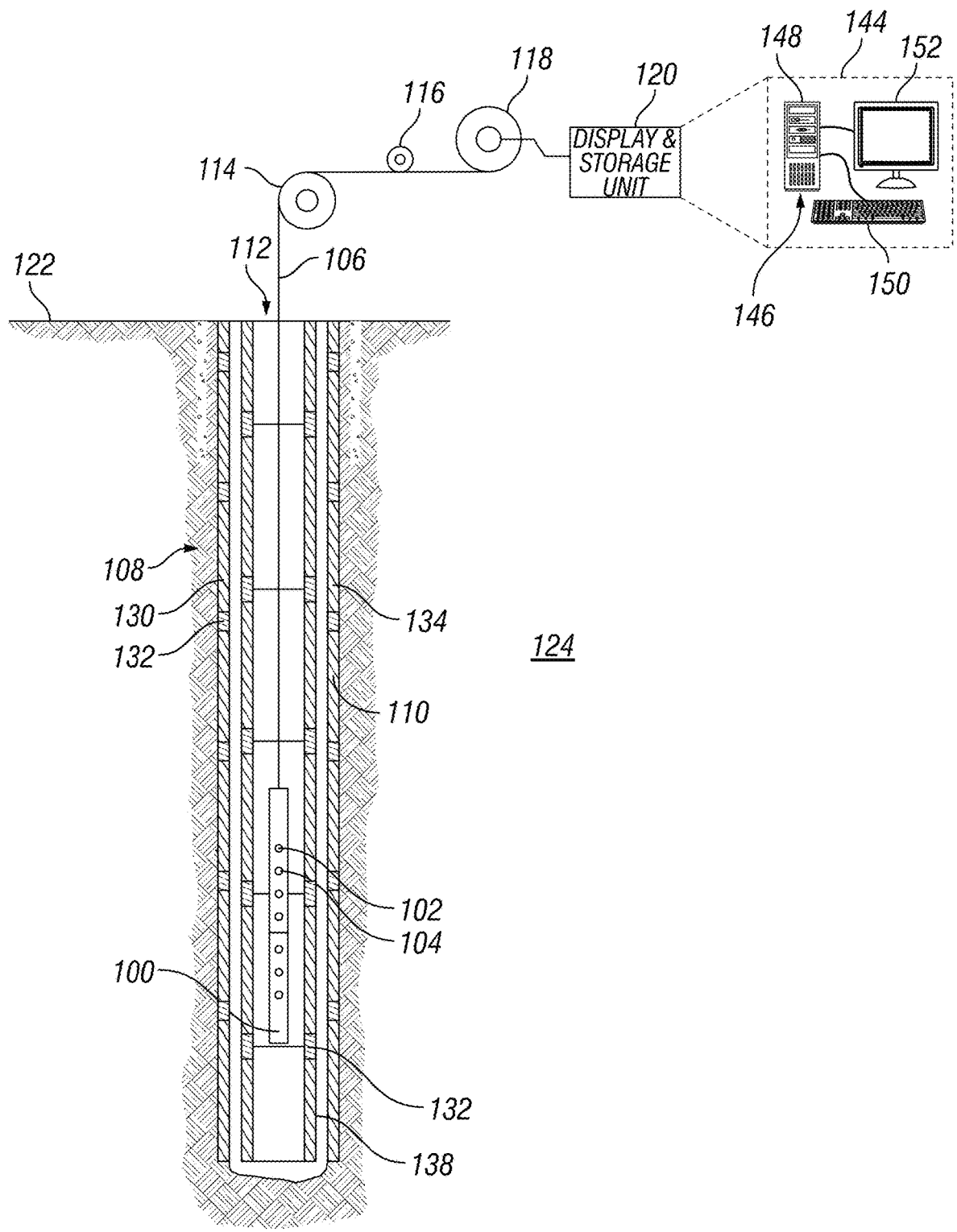
FIG. 1 illustrates a system including an acoustic logging tool.

FIG. 1 illustrates an operating environment for an acoustic logging tool 100 as disclosed herein. Acoustic logging tool 100 may comprise a transmitter 102 and/or a receiver 104. In examples, there may be any number of transmitters 102 and/or any number of receivers 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

Acoustic logging tool 100 may be used for excitation of transmitter 102. As illustrated, one or more receiver 104 may be positioned on the acoustic logging tool 100 at selected distances (e.g., axial spacing) away from transmitter 102. The axial spacing of receiver 104 from transmitter 102 may vary, for example, from about 0 inches (0 cm) to about 40 inches (101.6 cm) or more. In some embodiments, at least one receiver 104 may be placed near the transmitter 102 (e.g., within at least 1 inch (2.5 cm) while one or more additional receivers may be spaced from 1 foot (30.5 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may include more than one transmitter 102 and more than one receiver 104. For example, an array of receivers 104 may be used. Transmitters 102 may include any suitable acoustic source for generating acoustic waves downhole, including, but not limited to, monopole and multipole sources (e.g., dipole, cross-dipole, quadrupole, hexapole, or higher order multi-pole transmitters). Additionally, one or more transmitters 102 (which may include segmented transmitters) may be combined to excite a mode corresponding to an irregular/arbitrary mode shape. Specific examples of suitable transmitters 102 may include, but are not limited to, piezoelectric elements, bender bars, or other transducers suitable for generating acoustic waves downhole. Receiver 104 may include any suitable acoustic receiver suitable for use downhole, including piezoelectric elements that may convert acoustic waves into an electric signal.

Figure 2:
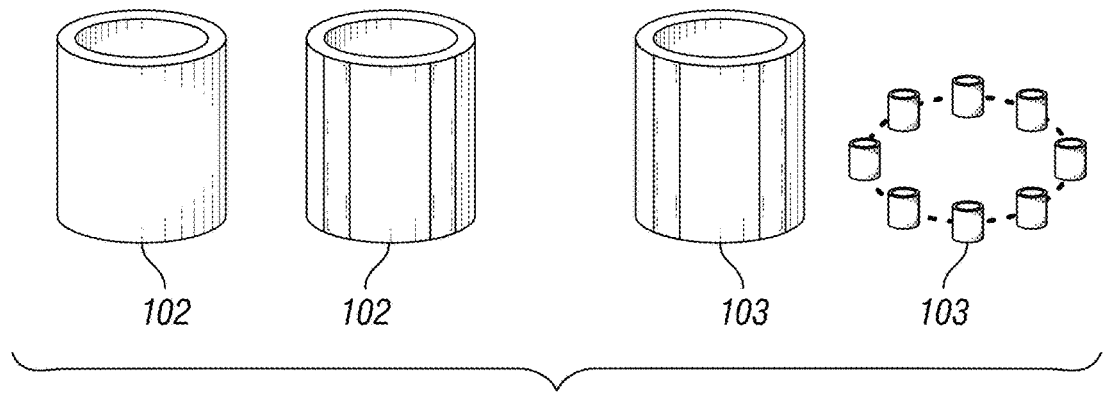
FIG. 2 illustrates an example of a transmitter and a receiver.

FIG. 2 illustrates examples of transmitter 102 and receiver 104. As discussed above, transmitters 102 (as well as receivers 104) may be a monopole or include multipole sources (e.g., dipole, cross-dipole, quadrupole, hexapole, or higher order multi-pole transmitters). Additionally, one or more transmitters 102 (which may include segmented transmitters) may be combined to excite a mode corresponding to an irregular/arbitrary mode shape. For example, transmitter 102 may be cylindrical and/or segmented piezoelectric tube. Additionally, transmitter 103 may be a monopole, a dipole, a quadrupole and/or a higher order transmitter. Receivers 104 may include a segmented piezoelectric tube, individual receiver, or azimuthal receivers, which may produce azimuthal variation of bonding behind casing 134. It should be noted that transmitter 102 and receiver 104 may be combined into a single element with the ability to both transmit acoustic waves and receiver acoustic waves, which may be identified as a transceiver.

Referring back to FIG. 1, transmission of acoustic waves by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks.

Figure 3:
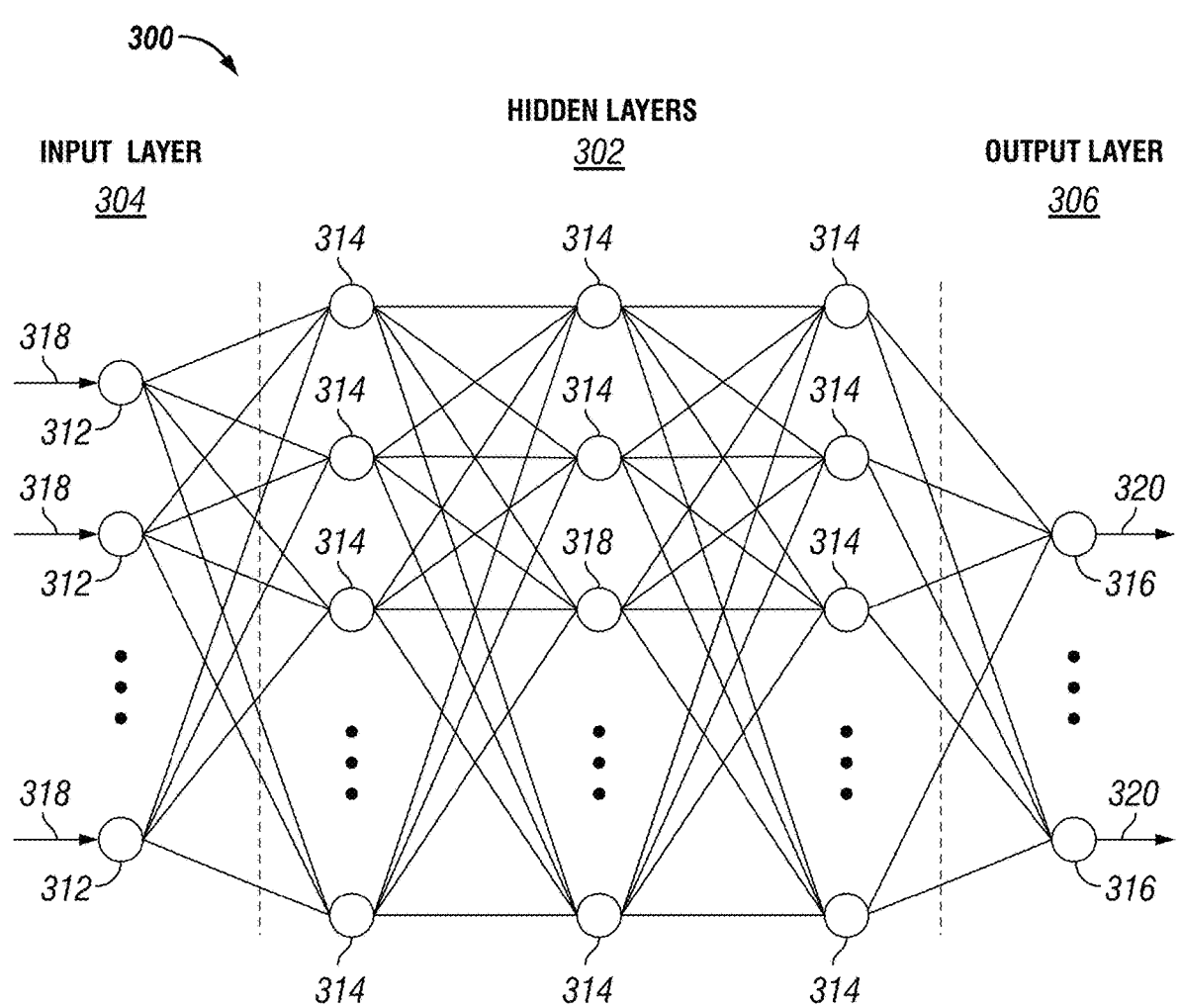
FIG. 3 illustrates a schematic of a neural network.

As discussed above, data measurements are processed using information handling system 144 (e.g., referring to FIG. 1) and, in examples, in conjunction with machine learning. There are many different types of machine learning models. For example, machine learning may be any form of neural network (NN), Convolutional Neural Network (CNN), Recurrent Neural Network (RNN), Deep Learning Neural Network (DNN), rand forest network, AI training, pattern recognition, Support Vector Machine (SVM), and/or the like. FIG. 3 illustrates an example of a machine learning model, specifically, a (NN). It should be noted that this is only an example, and many other forms of machine learning may be utilized. As illustrated in FIG. 3, a NN 300 is an artificial neural network with one or more hidden layers 302 between input layer 304 and output layer 306. In examples, NN 300 may be software on a single information handling system 144 (e.g., referring to FIG. 1). In other examples, NN 300 may software running on multiple information handling systems 144 connected wirelessly and/or by a hard-wired connection in a network of multiple information handling systems 144. As illustrated, input layer 304 may include measurement data 318 from acoustic logging tool 100 (e.g., referring to FIG. 1), and output layers 306 may be answer products 320 from the processing discussed above. During operations, measurement data 318 is given to neurons 312 in input layer 304. Neurons 312 are defined as individual or multiple information handling systems 144 connected in a network, which may compute the measurement data into graphs and/or figures using the processing techniques discussed above. The output from neurons 312 may be transferred to one or more neurons 314 within one or more hidden layers 302. Hidden layers 302 includes one or more neurons 314 connected in a network that further process information from neurons 312 according to processing techniques discussed above. The number of hidden layers 302 and neurons 312 in hidden layer 302 may be determined by an operator that designs NN 300. Hidden layers 302 is defined as a set of information handling system 144 assigned to specific processing steps identified above. Hidden layers 302 spread computation to multiple neurons 312, which may allow for faster computing, processing, training, and learning by NN 300.

Figure 4:
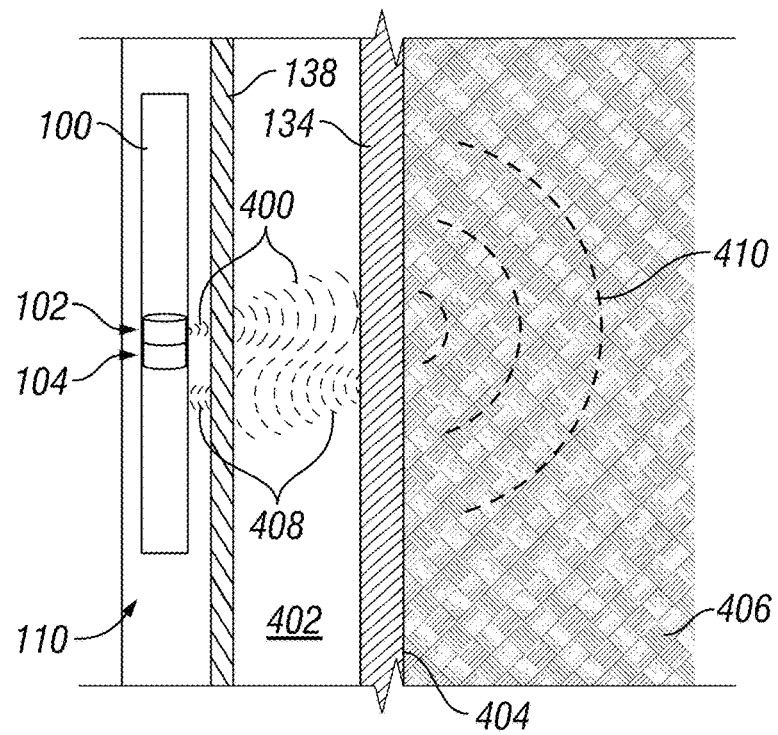
FIG. 4 illustrates the acoustic logging tool broadcasting a shaped signal.

FIG. 4 illustrates acoustic logging tool 100 disposed in wellbore 110, wherein transmitter 102 may broadcast a shaped signal 400 through pipe string 138, which may excite a fluid 402 that may be disposed between pipe string 138 and casing 134. Shaped signal 400 may be transmitted at 1 to 100 kHz. It should be noted that fluid 402 may comprise "mud" disposed downhole for drilling operations. Shaped signal 400 may lose energy as it passes through pipe string 138, however, shaped signal 400 may continue to resonate through fluid 402 to casing 134. At casing 134, shaped signal 400 may interact with boundary 404 that is casing 134 and material 406. Material 406 may be cement, water, air, and/or any combination thereof. The interaction at boundary 404 may cause result signal 408 and dissipated signal 410. Result signal 408 may be reflected off of boundary 404 back to acoustic logging tool 100. In examples, result signal includes reflections, refractions, and/or a resonance which is formed in late time.

As illustrated in FIG. 4, result signal 408 may interact with pipe string 138, pass through pipe string 138, and be sense, recorded, and/or measured by receiver 104. Result signal 408 may be between 1 to 100 kHz. Dissipated signal 410 may continue to move through material 406, which may continuously capture energy from dissipated signal 410 until dissipated signal 410 is extinguished.

Figure 5:
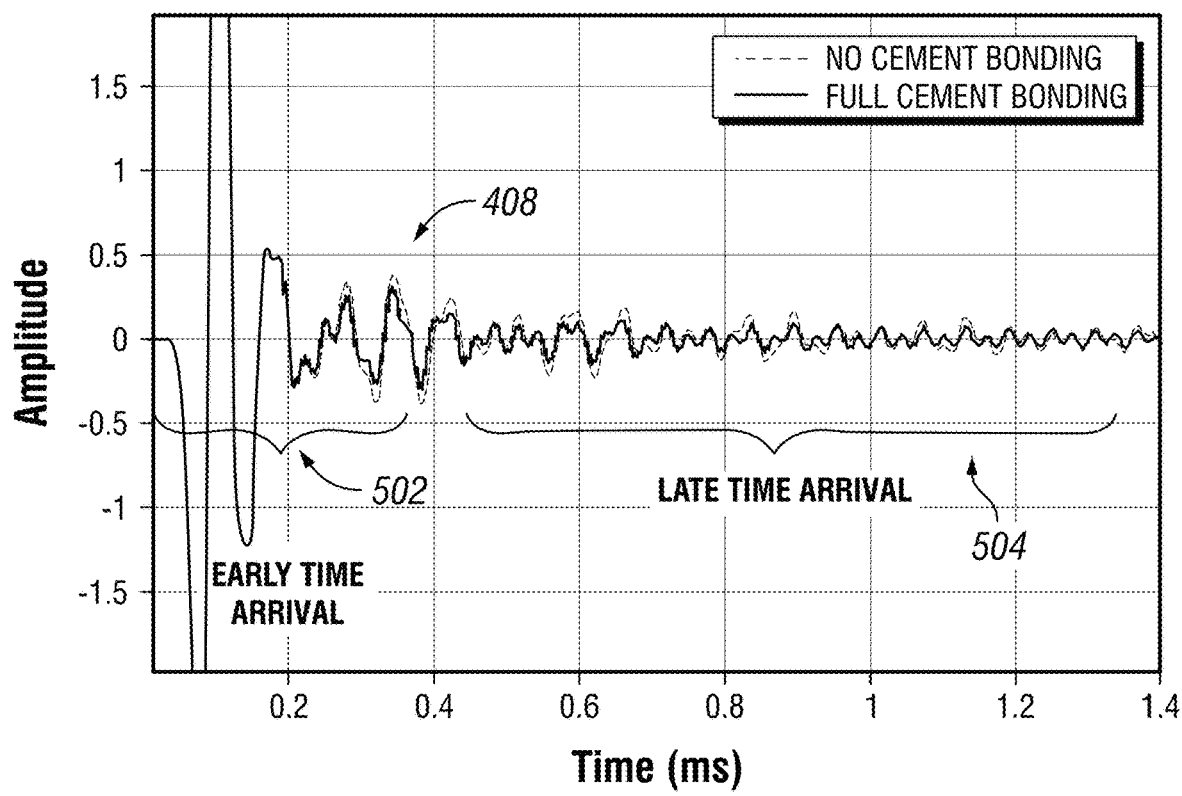
FIG. 5 is a graph of a time domain signal from a single receiver for two cement bonding conditions.

Result signal 408 may be processed to further determine if material 406 (i.e., cement, water, air, and/or the like) may be bonded to casing 134. For example, FIG. 5 illustrates a graph of one or more result signals 408, which was captured by receiver 104 (e.g., referring to FIG. 4). As illustrated, early time arrivals 502 contains a bulk of acoustic energy, which include reflection from pipe string 138, reflection from casing 134 through pipe string 138, guided wave refraction from pipe string 138, guided-wave refraction from casing 134 through pipe string 138 (e.g., referring to FIG. 4), Stoneley wave, tool wave, and/or the like. After a certain time, certain waves propagate away from receiver 104 in the form of guided casing wave, guided tubing wave, tool wave, Stonley wave or multiple reflections (e.g., not illustrated and represented by dissipated signal 410). Hence in late time arrivals 504, result signal 408 is observed to have fixed frequency components and with decreasing amplitude over time. This is considered as the borehole resonance mode.

Figure 21:
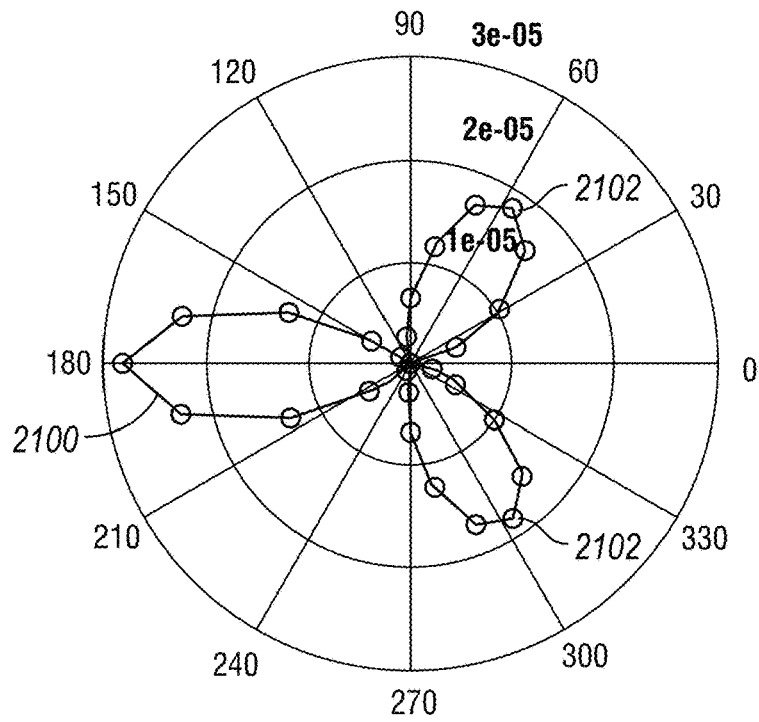
FIG. 21 is a graph of a mode shape at 16.3 kHz in an eccentric case.

The resonance mode may be categorized into multipole responses. For example, a monopole transmitter (e.g., referring to FIG. 2) will generate monopole resonance modes. With borehole asymmetry, a monopole transmitter may also generate other multiple resonance modes, such as the dipole and quadrupole modes. With eccentricity of pipe string 138 inside casing 134 (e.g., referring got FIG. 1), the mode shape may be distorted and irregular, for example, as seen in FIG. 21. FIG. 21 illustrates three lobes, a distorted lobe 2100 and two normal lobes 2102. Distorted lobe 2100 is an indicator of eccentricity of pipe string 138 in casing 134. Using an azimuthal receiver array will help to decompose the receiver response to monopole, dipole, quadrupole and higher order responses, or a response with any specific mode shape. Each resonance mode has a unique frequency, mode shape and modal decay rate.

Figure 6:
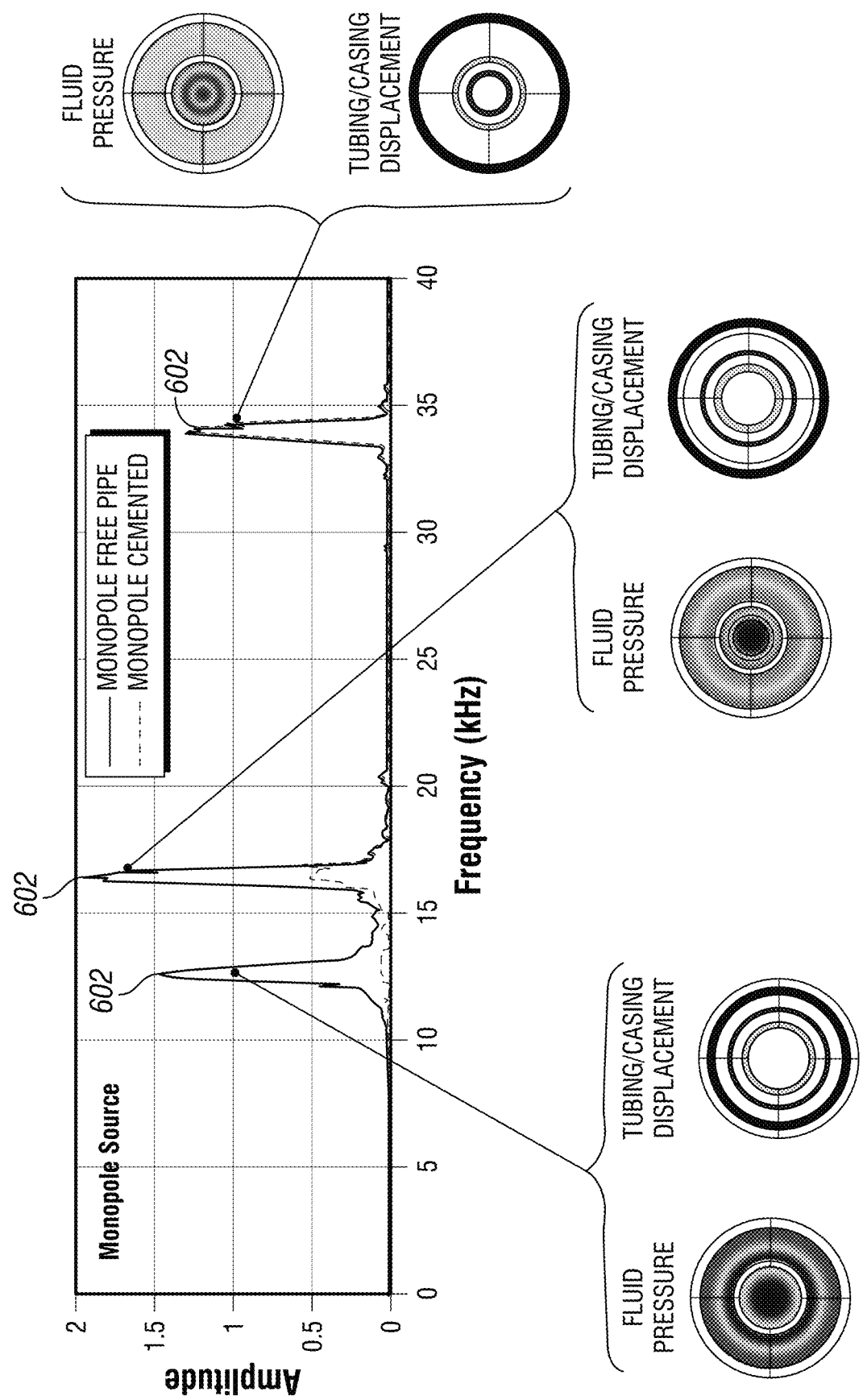
FIG. 6 is a graph of a decomposed monopole frequency domain response based on the late time arrival signals.

FIG. 6 illustrates an example of the decomposed monopole mode in the frequency domain generated from time-domain simulation. Three distinct resonance peaks 602 are observed. Comparing the response of free pipe (only fluid, no cement bond) and fully bonded casing 134 shows that not all resonance modes are sensitive to cement property. The first peak at 13 kHz is the most sensitive to cement bonding followed by the second peak at 16 kHz. The last peak at 34 kHz is minimally affected by cement bonding condition. Beside using time domain simulation result to determine cement-sensitive modes (as shown in FIG. 6 by comparing two frequency spectrum curves), the sensitivity to cement bonding may also be determined by performing a modal analysis to get the mode shape of each resonance modes. The mode shape of both fluid pressure and tubing/casing displacement is also shown in FIG. 6. It is observed that the first mode and second mode have comparable amount of acoustic energy in pipe string 138 as well as in the annulus. Casing 134 also shows displacement although it is smaller than displacement of pipe string 138. Displacement of casing 134 may create a leaky wave in material 406 behind casing 134. In examples, having a material 406 of higher acoustic impedance (cement, for example) will generate more attenuation to this borehole resonance mode. Hence the first two resonance modes are sensitive to cement bonding. Using the same principle, the last resonance mode is evaluated as not sensitive to cement bonding. This is because the acoustic pressure is mostly concentrated in pipe string 134, and displacement of casing 138 is minimal. Thus, this mode does not create as many, if any, leaky waves into material 406 (i.e., cement) and hence is not sensitive to cement bonding.

Figure 7:
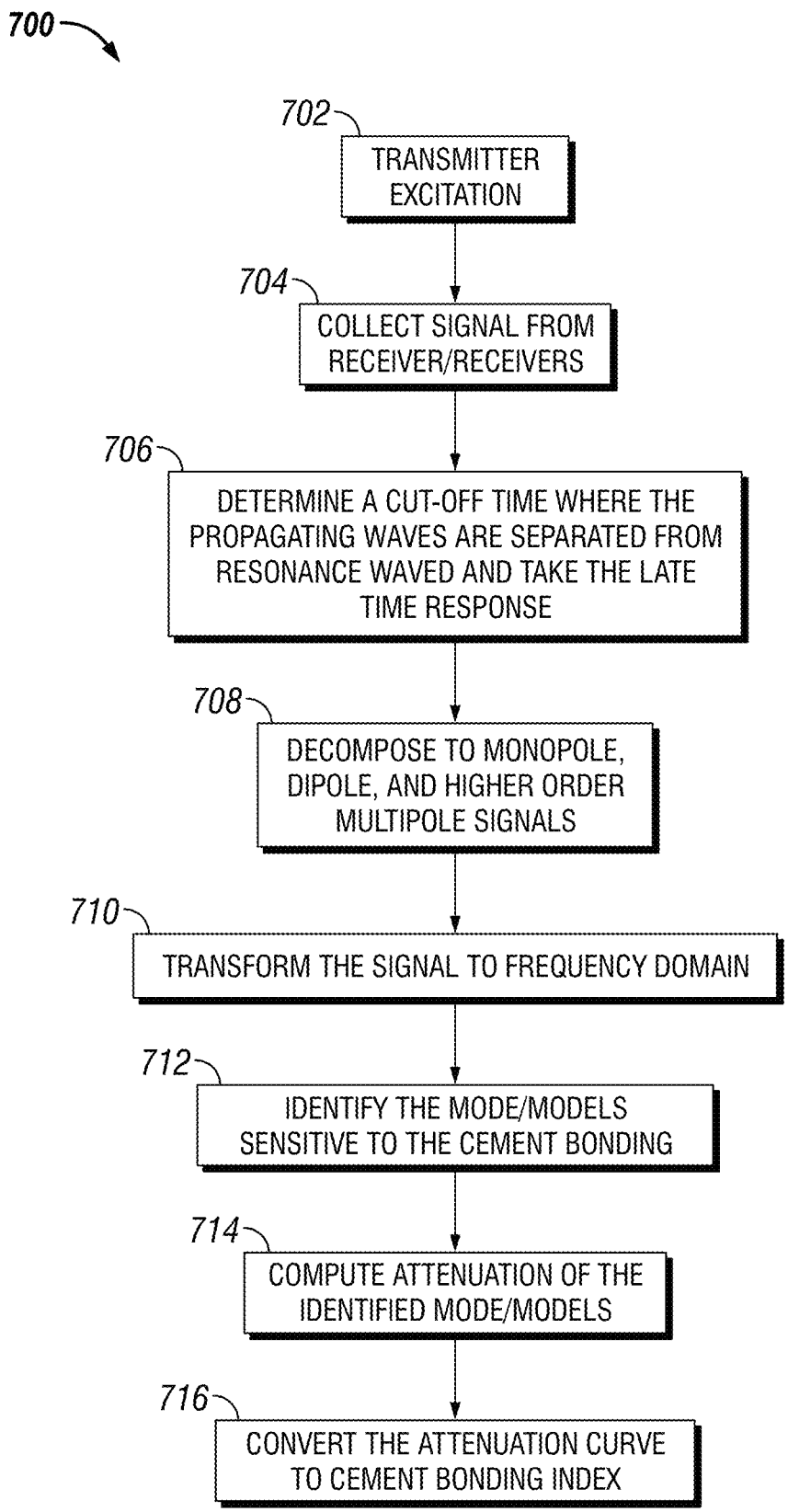
FIG. 7 illustrates a workflow for forming a cement bonding log.

FIG. 7 illustrates workflow 700 for forming a cement bond long. Workflow 700 may be implemented on information handling system 144 (e.g., referring to FIG. 1). Additionally, each block described below may further be implemented in NN 300. (e.g., referring to FIG. 3). Workflow 700 beings with block 702. Block 702 is generally described above in FIG. 4. Specific steps may include one or more transmitters 104 emitting a shaped signal 400 that interacts with pipe string 138, casing 134, and boundary 404 between casing 134 and material 406. Transmitter 104 may emit shaped signal 400 as a unipole, monopole, dipole or higher order multipole sources, or source with an arbitrary pattern. In block 704, with continued reference to FIG. 4, resulted signal 408 may be collected, recorded, measured, and/or stored by one or more receivers 102. A receiver 102 may be azimuthal receivers, unipole receivers, monopole receiver, dipole receiver or receiver for higher order multipoles.

In block 706, a cut-off time is determined to remove early time arrivals 502 (e.g., referring to FIG. 5) which has energy of modes other than the resonance modes. The time may be determined by the length of source waveform, diameters of pipe string 138 and/or casing 134, degree of eccentricity and transmitter-receiver (TR) offset. The remaining waveform may then be decomposed.

In block 708, the remaining waveform may then be decomposed to monopole, dipole, quadrupole and higher order multipole responses or a mode with a fixed arbitrary mode shape, for an azimuthal array receiver. For a monopole, dipole or higher order multipole receiver, the receiver may receive a signal of a specific multimode and may not need decomposition. This step may be optional, as the modes may be separated in frequency domain because each mode usually has a different peak in the frequency domain. Thus, for a signal without decomposition, monopole, dipole and higher order multipole peaks may be identified in the frequency domain.

In block 710, the time domain signal is transformed into frequency domain. Once in the frequency domain from block 710, the mode/modes which are sensitive to cement bonding may identified in block 712. Mode and/or modes that may be sensitive to cement bonding may be identified with logging data with known cement condition, experimental data, time-domain simulation, modal analysis, empirical formula, or a pre-constructed library.

Figure 8:
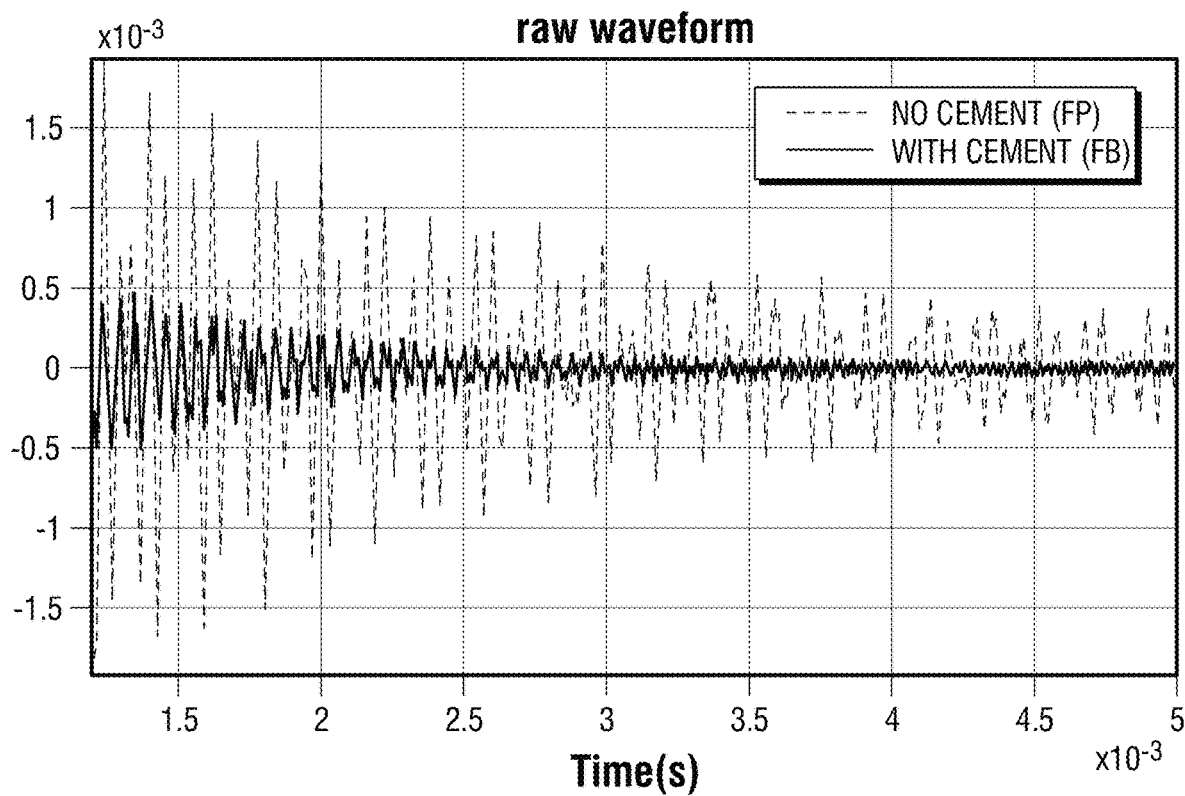
FIG. 8 is a graph of a recorded resulted signal containing two modes at 18.3 and 13.1 kHz.
Figure 9:
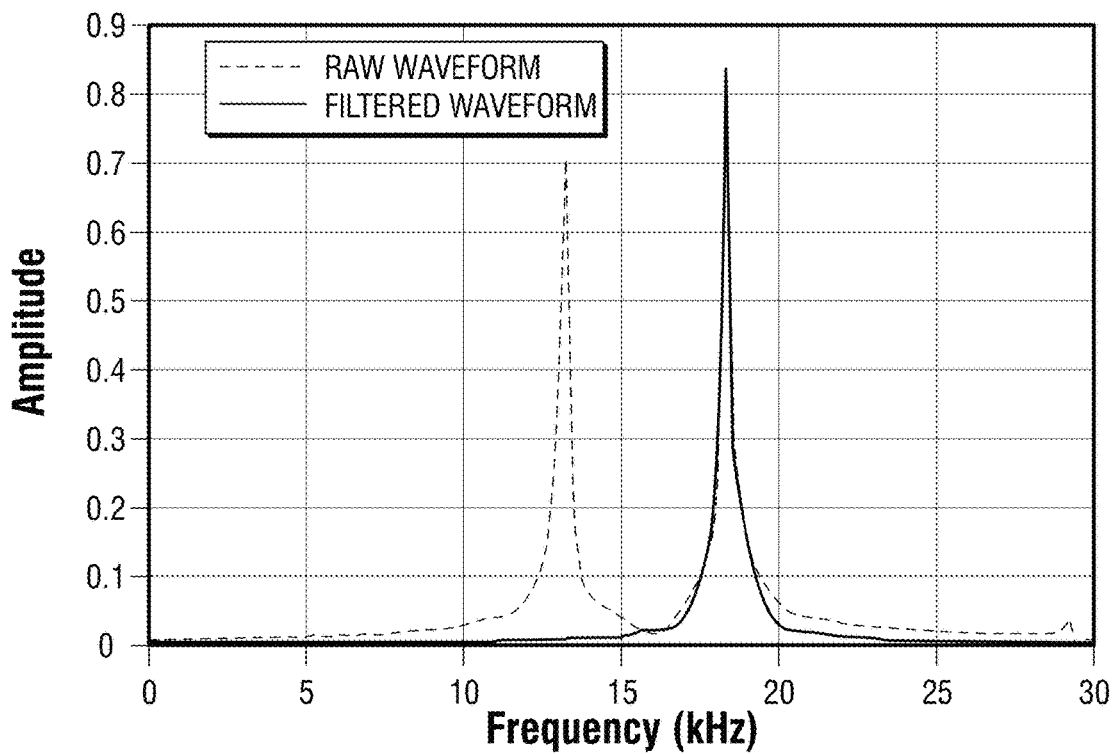
FIG. 9 is a graph of a raw waveform vs a filtered waveform.
Figure 10:
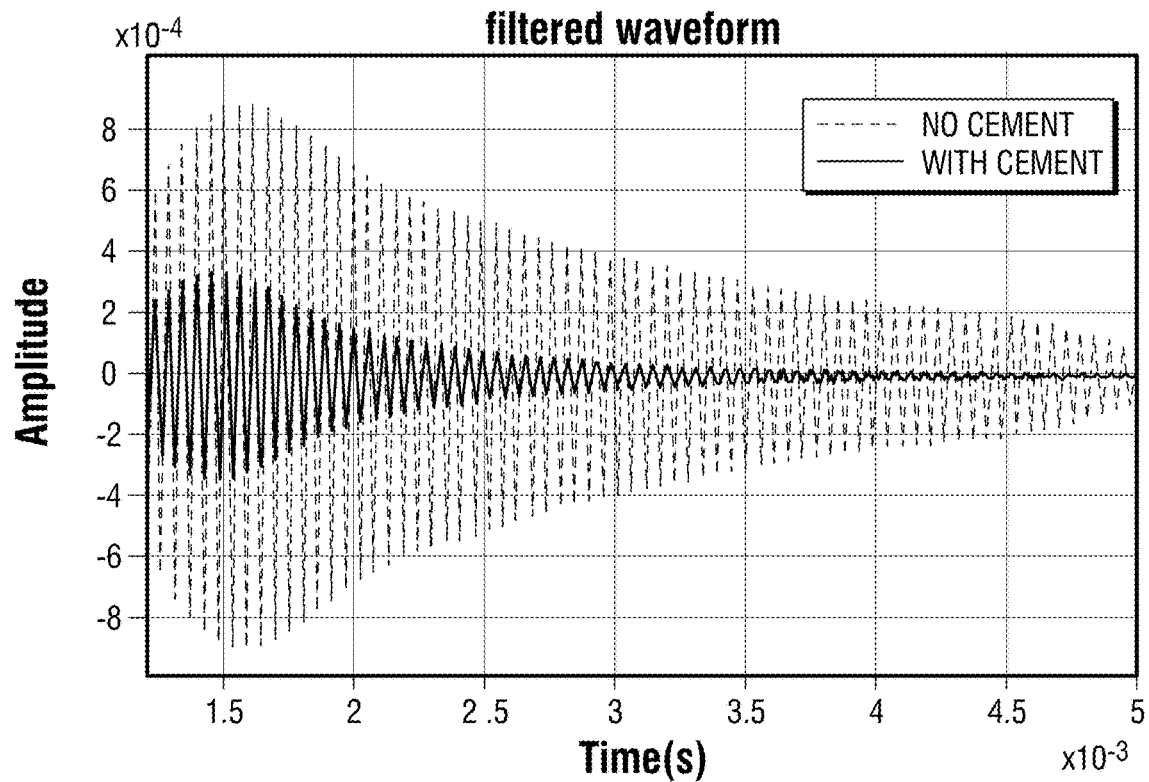
FIG. 10 is a graph of a recorded resulted signal after a band pass filter around 18.3 kHz is applied to the recorded resulted signal.
Figure 11:
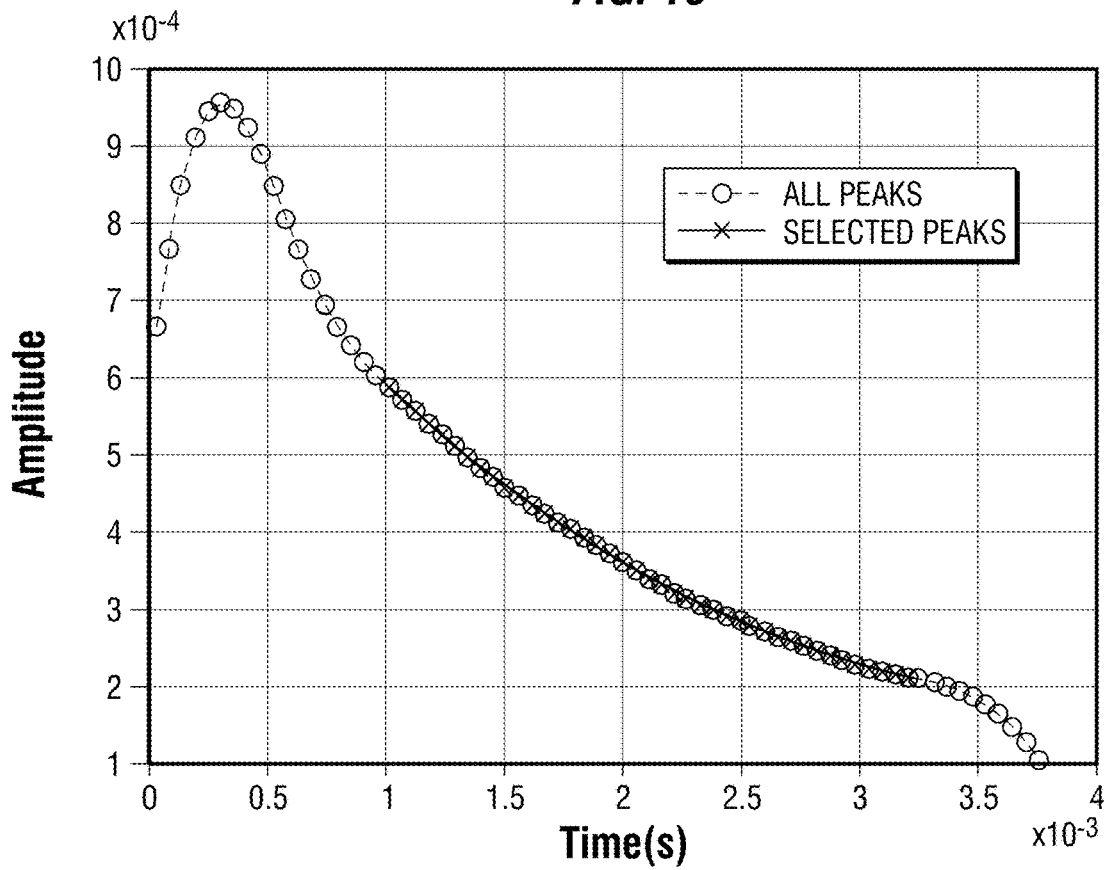
FIG. 11 is a graph showing the selection amplitude peaks.
Figure 12:
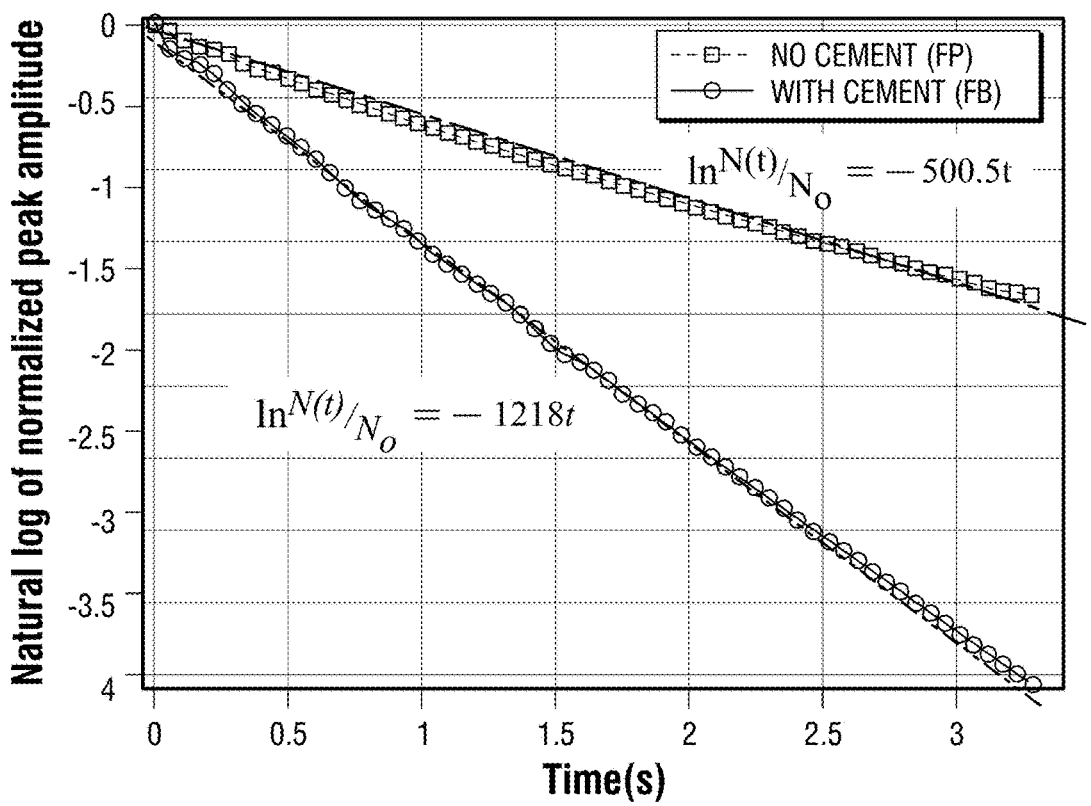
FIG. 12 is a graph plating the natural log of normalized amplitude against time to identifying an decay coefficient.
Figure 22:
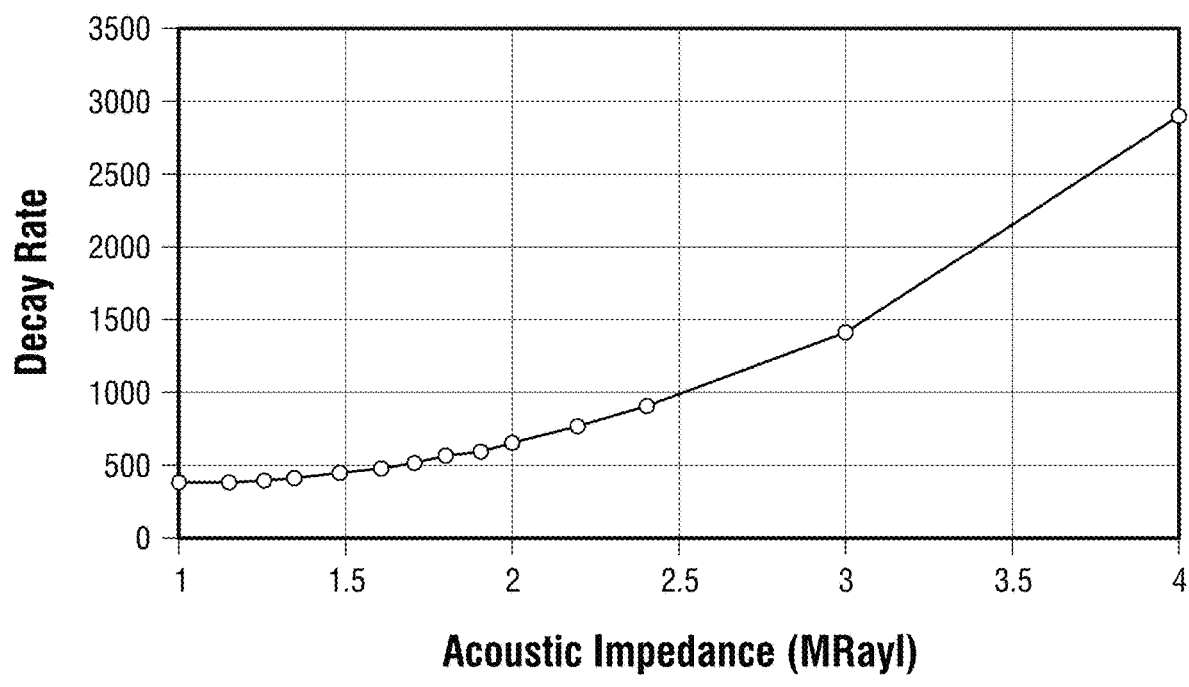
FIG. 22 is a graph between acoustic impedance of the material outside a casing and exponential decay rate for a selected mode.

After identifying proper modes in block 712, the energy decay of the identified mode/modes are calculated in block 714. For example, a time-frequency analysis may be performed on the time-domain signal. The amplitude of a specific mode over time may be plotted to measure the decay. Alternatively, the method to compute decay of the identified mode using amplitude of the band-pass filtered signal may be used. This may be performed by taking the raw signal, as shown in FIGS. 8 and 9, of result signal 408 from block 704 and apply a band pass filter, as shown in FIG. 10, on the raw signal (or multipole decomposed signal) to filter out a single mode which is sensitive to cement bonding. From the filtered signal in FIG. 10, the amplitude of the filtered signal may be extracted, either by picking the peaks, as seen in FIG. 11, or finding an envelope using Hilbert transform. Third, remove the leading and trailing signals which shows inaccurate amplitude due to filtering described above. From this evaluation in block 714, a cement bond log may be populated in block 716. A cement bonding log may be formed in block 716 through calculation based on the decay curve. For examples, calculating a bonding index on the decay curve may be computed by identifying the decay coefficient of the decay curve. For example, assuming an exponential decay:

$$N(t) = N_0 e^{-\lambda t} \quad (1)$$

$$\ln \frac{N(t)}{N_o} = -\lambda t \quad (2)$$

and fitting the amplitude verses time to find the coefficient λ. Using the coefficient λ the decay rate may be used to evaluate the acoustic impedance of the bonding material. FIG. 22 is a graph that illustrates how the decay rate, and the acoustic impedance may be connected to show the bonding between material 406 and casing 134. As seen in in FIG. 12, the selected peaks from FIG. 11 may be plotted using natural log of normalized amplitude against time. Using Equations (1) & (2), the graph in FIG. 12 shows taking the selected peaks form FIG. 11 and plotting the natural log of normalized amplitude against time. The resulting coefficient is the decay coefficient. The cement bonding index may be used to further train NN 300 (e.g., referring to FIG. 1), as well as stored on NN 300, so that cement bonding evaluation may be performed in-situ.

Figure 13:
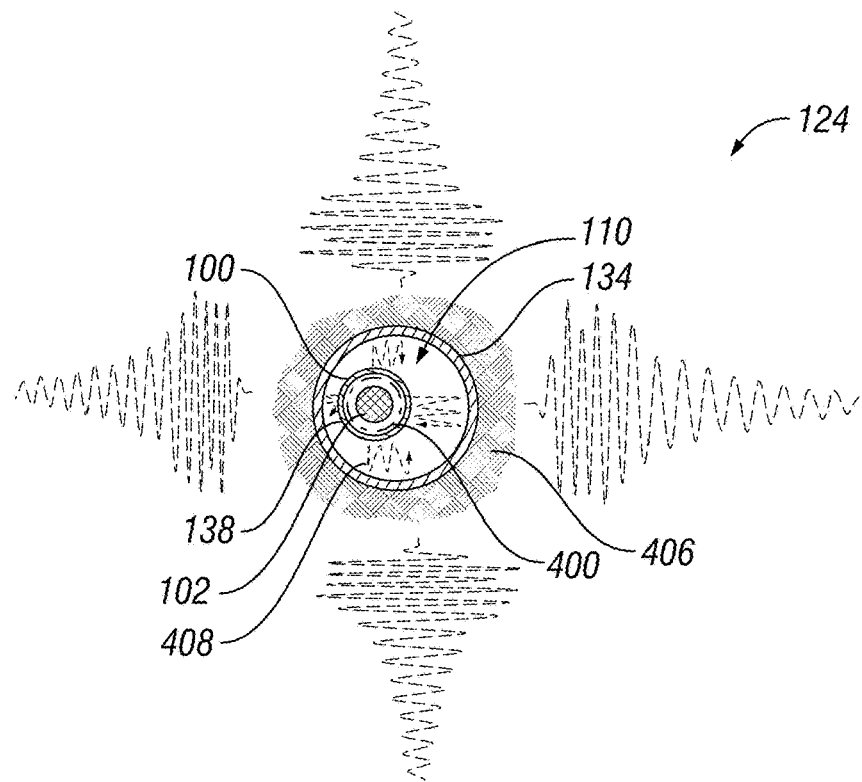
FIG. 13 illustrates a top-down perspective of a wellbore in which acoustic logging tool is disposed in an eccentric configuration and broadcasting a signal.

As discussed above, in reference to FIG. 6, the eccentricity of pipe string 138 and/or casing 134 may affect analyses and/or measurements of cement bonding between casing 134 and material 406. FIG. 13 illustrates a top-down view of acoustic logging tool 100 dispose in pipe string 138, which may be disposed in casing 134. As illustrated, transmitter 102 (Referring to FIG. 4) may broadcast in any direction from acoustic logging tool 100. Often, pipe string 138 may not be placed at the center of casing 134. Thus, the annulus width, distance between pipe string 138 and casing 134, may change azimuthally. For this, a shaped signal 400 may be broadcasted and recorded to determine a signal for detecting a bond of material 406 to casing 134 and formation 124. Shaped signal 400 may be designed adaptably based on in-situ observations or predefined pulse based on the geometry of wellbore 110. Thus, acoustic logging tool 100 may include a transmitter 102 with programmable firing wavelet and associated receiver 104, as discussed above. Transmitter 102 may be a monopole or multipolar radiation source and receiver 104 could also be monopole or multipolar receiving system. Since transmitter 102 and receiver 104 may be disposed close to each other to obtain an optimized signal, there may be a timing mechanism of receiver muting system which may help increase a dynamic range of a result signal 408, which may determine the material behind casing 134, as discussed above.

Figure 14:
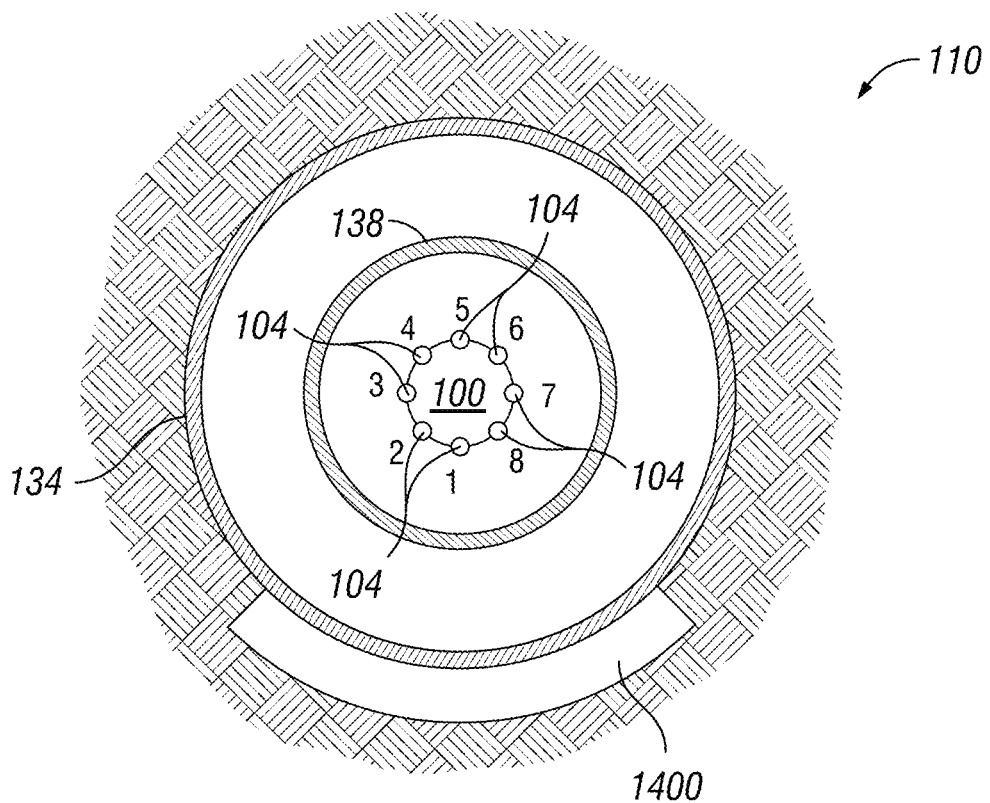
FIG. 14 illustrates a top-down perspective of a wellbore in which acoustic logging tool is disposed in a non-eccentric configuration with a partially bonded material to a casing.
Figure 15:
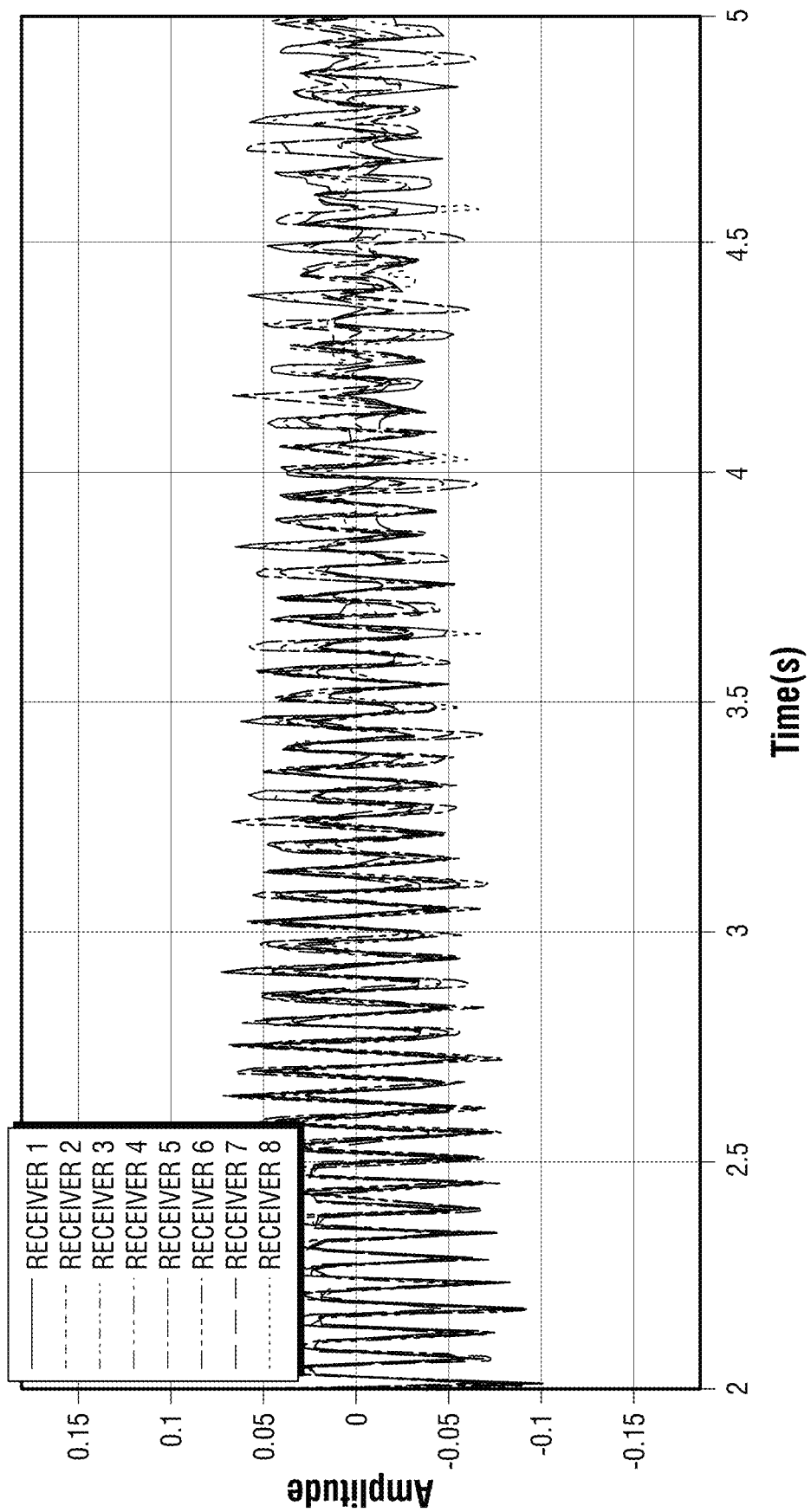
FIG. 15 is a graph of responses of a resulted signal of azimuthal receivers for a partially bonded case from FIG. 14.
Figure 16:
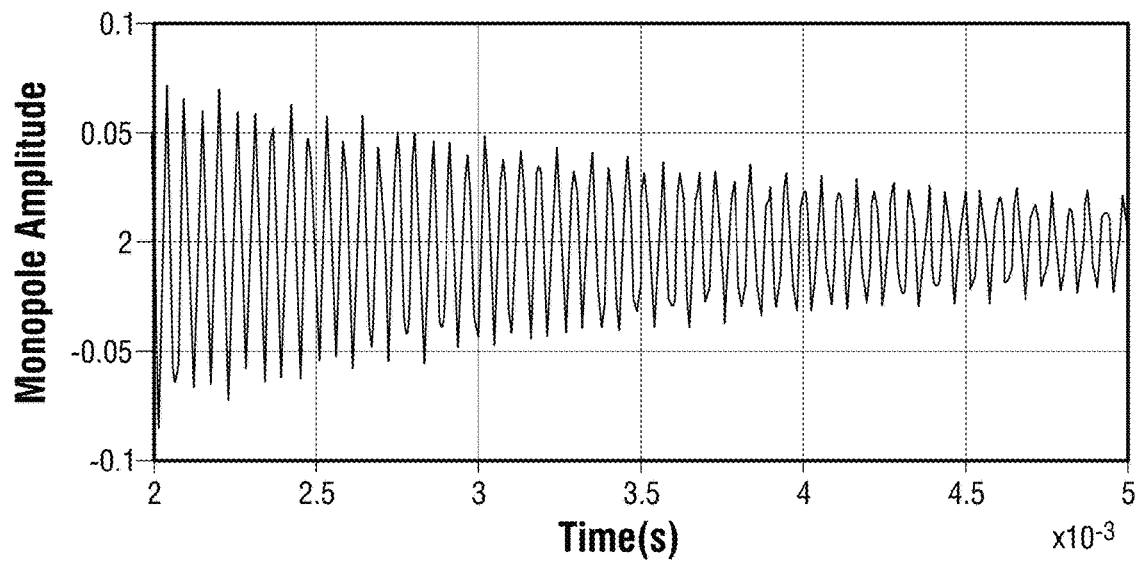
FIG. 16 is a graph of a monopole response decomposed from the signals in FIG. 15.
Figure 17:
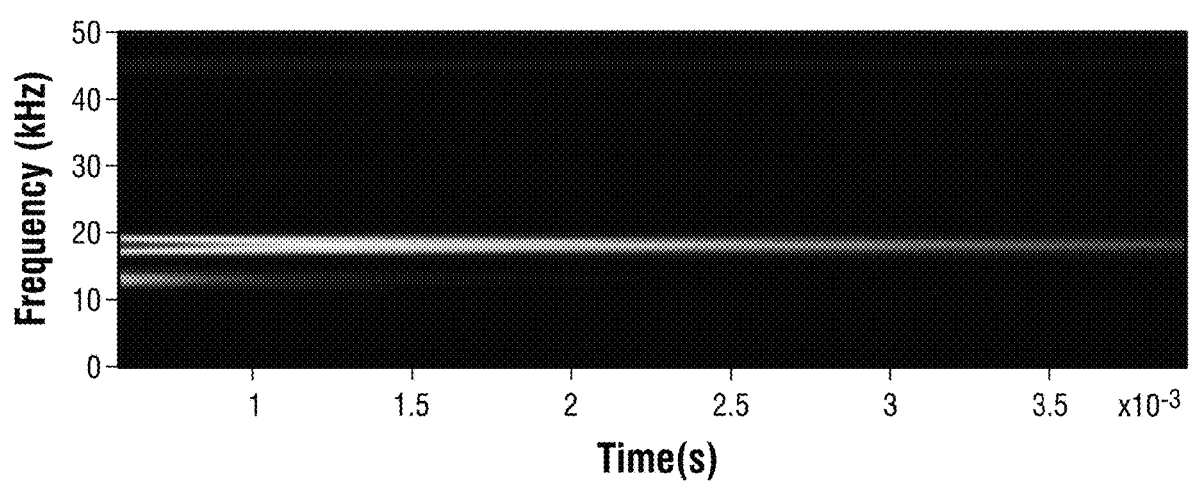
FIG. 17 is a graph of the monopole response transformed into time-frequency domain from FIG. 16.

To show how eccentricity affects measurements, FIGS. 14-18 will illustrate the use of methods and described above and laboratory data in which no eccentricity exist to form a cement bond log. In this example, FIG. 14 shows a model of wellbore 110 with acoustic logging tool 100, pipe string 138, casing 134 and partially bonded cement 1400. In examples, a monopole transmitter transmits an excitation and the signal from 8 azimuthal receivers 104. FIG. 15 is a graph illustrating the recorded and measured signal of result signal 408

Figure 18:
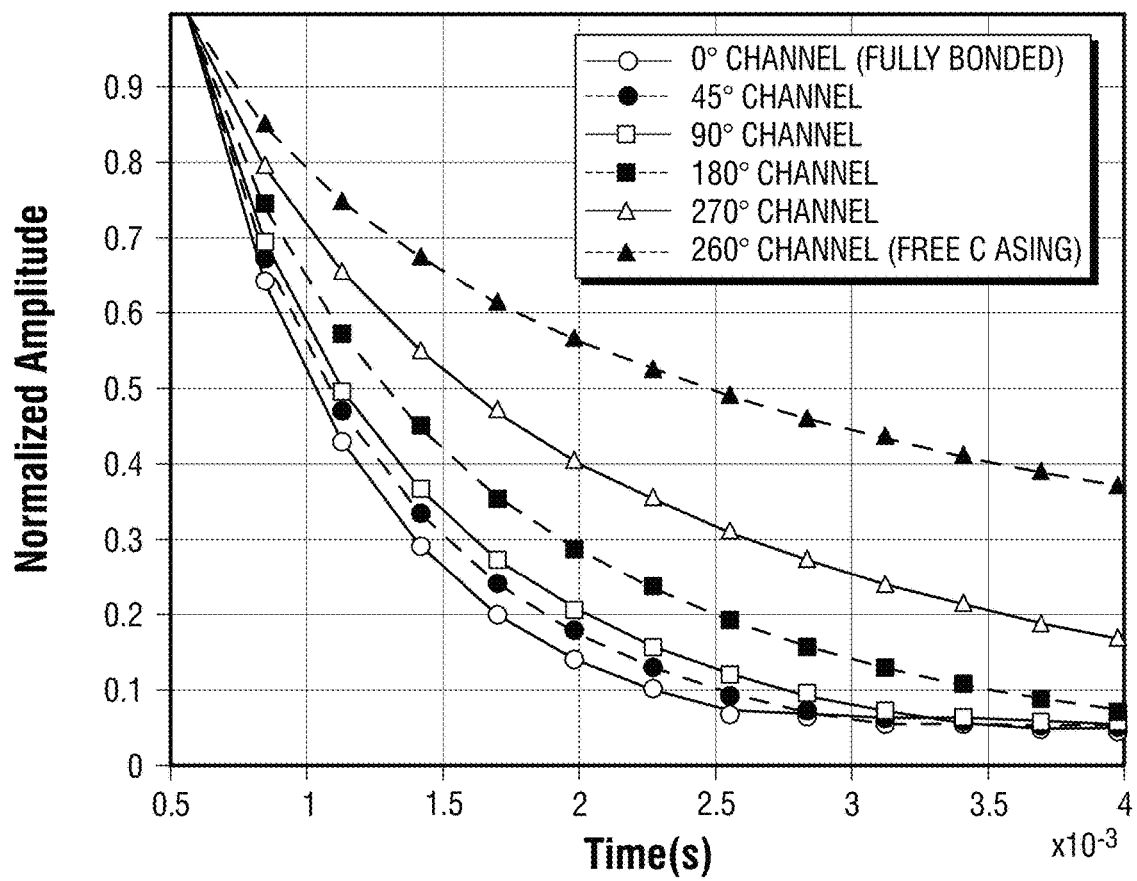
FIG. 18 is a graph of a decay curve for the resonance mode at 18 kHz for different types of cement bonding from the measurements in FIG. 17.

(e.g., referring to FIG. 4) at each receiver 104 (e.g., referring to FIG. 14. Using the method described above in FIG. 7, the result signals 408 may then be decomposed into monopole response which is plotted in FIG. 16. The time-domain signal may then be transmitted into time-frequency domain, which is graphed in FIG. 17. In this example, and discussed above, a monopole resonance mode at 13 kHz and 18 kHz may be sensitive to cement bonding. FIG. 18 shows the decay curved, obtained using the methods discussed above, for the 18 kHz mode from the time-frequency domain plot. It is observed that various cement bonding conditions are separated, and higher percentage of cement bonding is related to higher rate of decay. The curves may then be related to a cement bonding log and stored for later use.

Figure 19A:
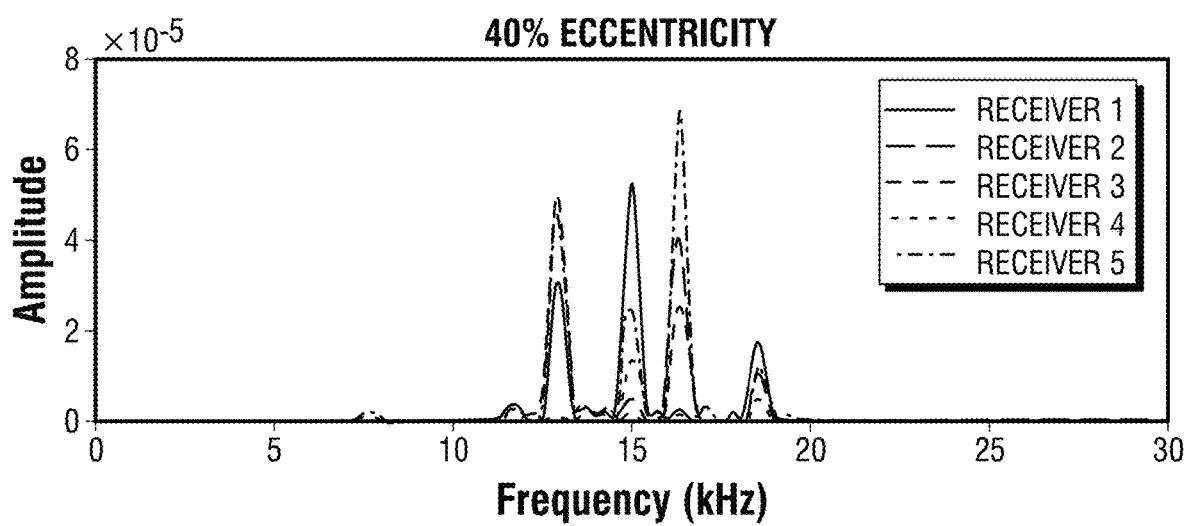
FIGS. 19A-19C are graphs illustrating frequency domain response for different eccentricity.
Figure 19B:
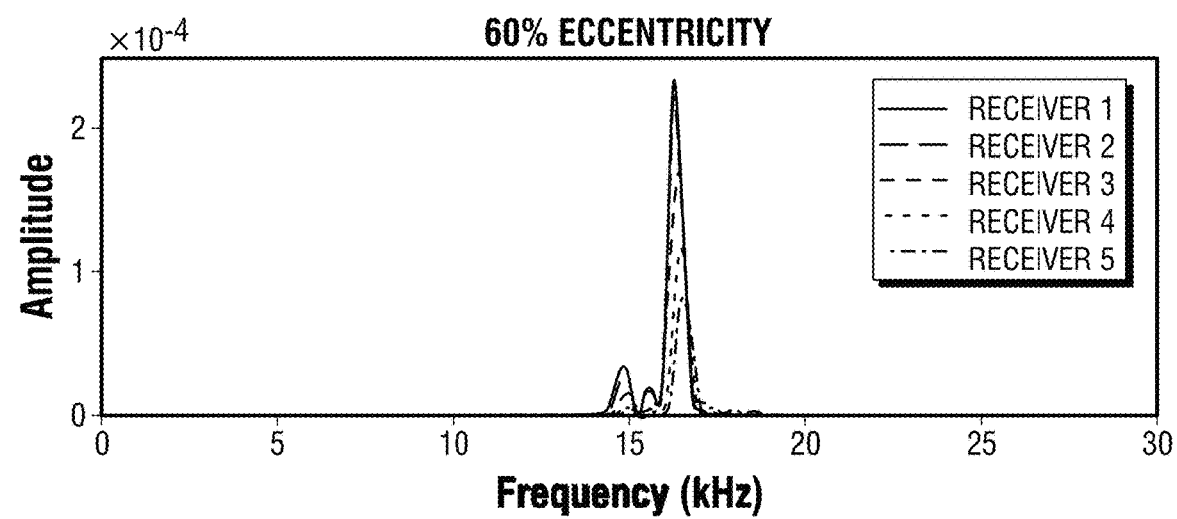
Figure 19C:
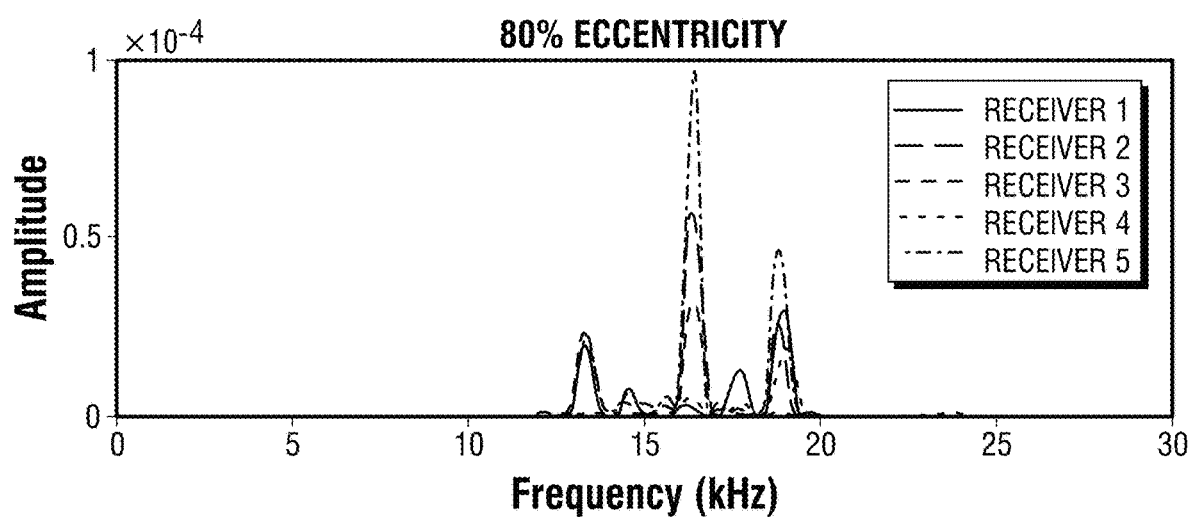
Figure 20:
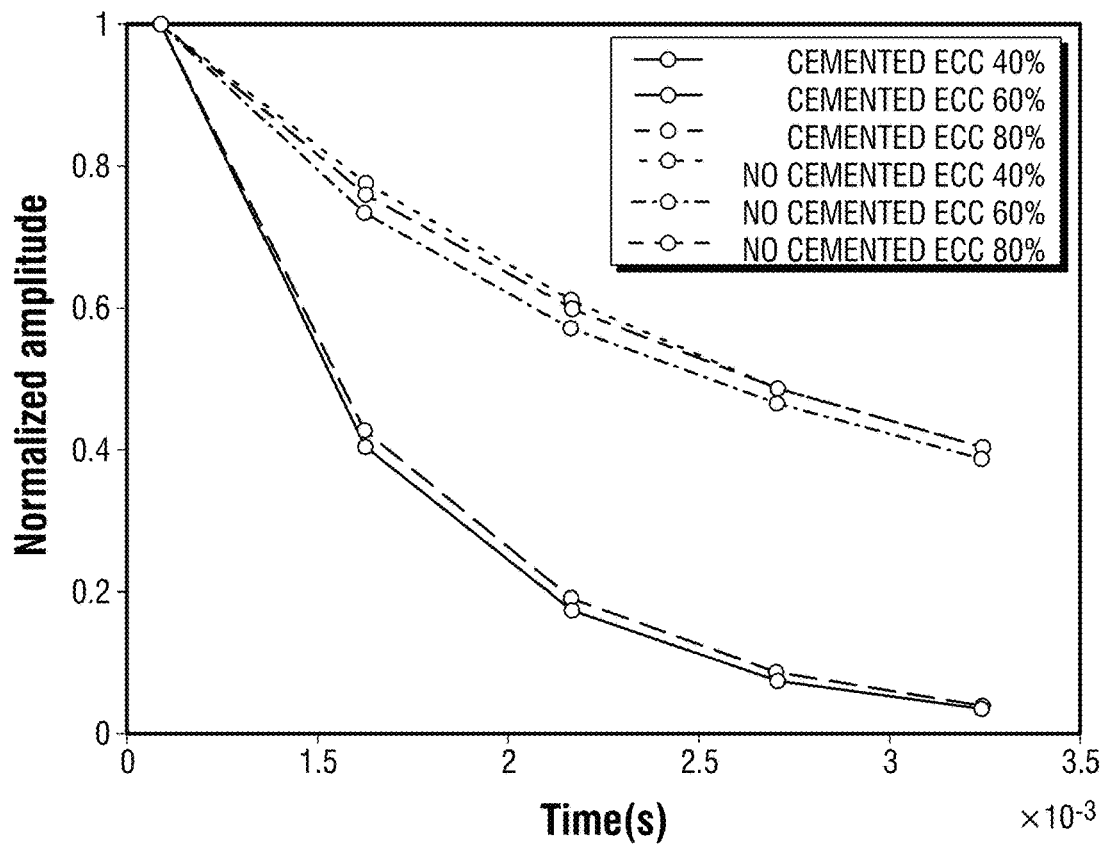
FIG. 20 is a graph illustrating decay of the monopole mode at 16.4 kHz at various eccentricity and with full cement bonding and no cement bonding from FIGS. 19A-19C.

When eccentricity exist, such as seen in FIG. 1, more complicated resonance modes are created, as graphed in FIG. 19, as compared to the graph in FIG. 6 in which eccentricity is not present. FIG. 19A illustrates eccentricity in 40 percent at a location in wellbore 110 (e.g., referring to FIG. 1) in which measurements are taken by acoustic logging tool 100 (e.g., referring to FIG. 1. Unlike centric cases (e.g., referring to FIGS. 14 and 6) in which amplitude may be used in measuring cement bonding, eccentricity affects the amplitude of the resonance modes, as illustrated and discussed above in FIG. 21. This is also the reason that the disclosed method of workflow 700 (e.g., referring to FIG. 7) employs decay rate to evaluate cement bonding and form a cement bonding log. For the systems and methods disclosed, eccentricity is measured by a percentage, which is calculated by acoustic logging tool/pipe string offset from the casing center divided by annulus thickness. The annulus thickness is the thickness of annulus when pipe string 138 (e.g., referring to FIG. 13) is concentric with respect to casing 138 (e.g., referring to FIG. 13). FIG. 19A shows an eccentric pipe string 138 and acoustic logging tool 100 with 40% eccentricity. FIG. 19B shows the same with a 60% eccentricity and FIG. 19C shows the same with an 80% eccentricity. Applying workflow 700 to each eccentricity case in FIGS. 19A-19C, the results are shown in graph of FIG. 20. The decay is computed for monopole modes of 16.4 kHz. It is observed that the three fully cemented case with different eccentricity are consistent with each other. The three free pipe (no cement bonding) cases are also consistent with each other. The cemented cases have higher decay rate which agree with the physics of resonance mode and leaky wave explained in earlier sections.

The methods and systems described above are an improvement over current technology in the methodology and systems used to form a cement bond long. For example, as described above, method may use multipole decomposition to evaluate monopole, dipole or quadrupole responses separately. Additionally, systems and methods may also employ different multipoles of source, such as a monopole source, a dipole source or a quadrupole source. In other examples, disclosed methods and systems uses a cut-off time where the first arrived energy is propagated away, and the resonance modes are fully formed. Identifying resonance modes may allow for the methods and systems to use decay rate to evaluate cement bonding condition and form a cement bond long. Methods and systems described above take into consideration that amplitude varies due to eccentricity and other factors, hence it is not recommended to be used to evaluate cement bonding condition. As noted above, the disclosed methods and systems are an improvement over current technology in that resonance modes are found and used to form the cement bond long, which is standing waves of different modes of the borehole structure. The systems and methods disclosed herein may include any of the various features of the systems and methods disclosed herein, including one or more of the following statements.

Statement 1: A method may include disposing an acoustic logging tool in a wellbore, broadcasting a shaped signal with the acoustic logging tool such that the shaped signal interacts with a boundary of a casing and a material and recording a result signal from the boundary with the acoustic logging tool. The method may further comprise identifying a cut-off time to be applied to the result signal, transforming the result signal from a time domain to a frequency domain, selecting one or more modes sensitive to a bonding at the boundary between the casing and the material, computing a decay rate of the one or more modes that were selected based at least one or more decay curves, and converting the decay rate to a bonding log.

Statement 2: The method of statement 1, wherein the material comprises air, water, borehole fluid, gas, oil, cement, or any combinations thereof.

Statement 3. The method of statements 1 or 2, wherein the acoustic logging tool further comprises a transmitter that is a monopole, a dipole, a quadrupole, a unipole, a higher azimuthal order source, or a source with an asymmetrical radiation pattern.

Statement 4. The method of statement 3, further comprising decomposing the result signal from the monopole, the dipole, the quadrupole, the unipole, the higher azimuthal order receiver, or the source with the asymmetrical given mode shape.

Statement 5. The method of statements 1, 2, or 3, further comprising dividing the result signal into one or more early time arrival waveforms and one or more late time arrival waveforms, wherein the result signal is between 5 and 100 kHz.

Statement 6. The method of statement 5, wherein the cut-off time removes the one or more early time arrival waveforms.

Statement 7. The method of statements 1, 2, 3, or 5, further comprising applying a filter to the one or more modes to form a filtered signal.

Statement 8. The method of statement 7, further comprising extracting one or more amplitudes from the filtered signal.

Statement 9. The method of statement 8, wherein the decay rate is computed from the one or more amplitudes.

Statement 10. The method of statement 9, further comprising calculating a decay coefficient by fitting the one or more amplitudes to a decay function or calculating a ratio of the one or more amplitudes from a first time window and a second time window.

Statement 11. The method of statement 10, further comprising decomposing the result signal to a time-frequency domain and extracting one or more amplitudes at a selected frequency to identify the decay rate of the selected frequency.

Statement 12. A well measurement system may include an acoustic logging tool, wherein the acoustic logging tool may include at least one transmitter, wherein the at least one transmitter is configured to broadcast a shaped signal such that the shaped signal interacts with a boundary of a casing and a material and at least one receiver, wherein the at least one receiver is configured to record a resulted signal from the boundary with the receiver. The well measurement system may further include a conveyance, wherein the conveyance is attached to the acoustic logging tool and an information handling system. The information handling system may be configured to identify a cut-off time to be applied to the result signal, transform the result signal from a time domain to a frequency domain, select one or more modes sensitive to a bonding at the boundary between the casing and the material, compute a decay rate of the one or more modes that were selected to find a decay curve, and convert the decay curve to a bonding log.

Statement 13. The well measurement system of statement 12, wherein the material comprises air, water, borehole fluid, gas, oil, cement, or any combinations thereof.

Statement 14. The well measurement system of statements 12 or 13, wherein the transmitter is a monopole, a dipole, a quadrupole, a higher azimuthal order source, or a source with an asymmetrical radiation pattern.

Statement 15. The well measurement system of statement 14, wherein the information handling system is further configured to decompose the result signal from the transmitter of the receiver.

Statement 16. The well measurement system of statements 12-14, wherein the information handling system is further configured to divide the result signal into one or more early time arrival waveforms and one or more late time arrival waveforms, wherein the result signal is between 20 and 100 kHz.

Statement 17. The well measurement system of statement 16, wherein the cut-off time removes the one or more early time arrival waveforms.

Statement 18. The well measurement system of statements 12-14 and 16, wherein the information handling system is further configured to apply a filter to the one or more modes to form a filtered signal.

Statement 19. The well measurement system of statement 18, wherein the information handling system is further configured to select one or more amplitudes from the filtered signal, wherein the decay rate is computed from the one or more amplitudes and calculate a decay coefficient by fitting the one or more amplitudes to a decay function or calculating a ratio of the one or more amplitudes from a first time window and a second time window.

Statement 20. The well measurement system of statements 12-14, 16, or 18, wherein the information handling system is further configured to decompose the result signal to a time-frequency domain and extracting one or more amplitudes at a selected frequency to identify the decay rate of the selected frequency.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method, comprising:
   disposing an acoustic logging tool in a wellbore;
   broadcasting a shaped signal with the acoustic logging tool such that the shaped signal interacts with a boundary of a casing and a material;
   recording a result signal from the boundary with the acoustic logging tool;
   identifying a cut-off time to be applied to the result signal;
   transforming the result signal from a time domain to a frequency domain;
   selecting one or more modes sensitive to a bonding at the boundary between the casing and the material;
   computing a decay rate of the one or more modes that were selected based at least one or more decay curves; and
   converting the decay rate to a bonding log.

2. The method of claim 1, wherein the material comprises air, water, borehole fluid, gas, oil, cement, or any combinations thereof.

3. The method of claim 1, wherein the acoustic logging tool further comprises a transmitter that is a monopole, a dipole, a quadrupole, a unipole, a higher azimuthal order source, or a source with an asymmetrical radiation pattern.

4. The method of claim 3, further comprising decomposing the result signal from the monopole, the dipole, the quadrupole, the unipole, the higher azimuthal order receiver, or the source with the asymmetrical given mode shape.

5. The method of claim 1, further comprising dividing the result signal into one or more early time arrival waveforms and one or more late time arrival waveforms, wherein the result signal is between 5 and 100 kHz.

6. The method of claim 5, wherein the cut-off time removes the one or more early time arrival waveforms.

7. The method of claim 1, further comprising applying a filter to the one or more modes to form a filtered signal.

8. The method of claim 7, further comprising extracting one or more amplitudes from the filtered signal.

9. The method of claim 8, wherein the decay rate is computed from the one or more amplitudes.

10. The method of claim 9, further comprising calculating a decay coefficient by fitting the one or more amplitudes to a decay function or calculating a ratio of the one or more amplitudes from a first time window and a second time window.

11. The method of claim 10, further comprising decomposing the result signal to a time-frequency domain and extracting one or more amplitudes at a selected frequency to identify the decay rate of the selected frequency.

12. A well measurement system comprising:
    an acoustic logging tool, wherein the acoustic logging tool comprises:
        at least one transmitter, wherein the at least one transmitter is configured to broadcast a shaped signal such that the shaped signal interacts with a boundary of a casing and a material; and
        at least one receiver, wherein the at least one receiver is configured to record a resulted signal from the boundary with the receiver;
    a conveyance, wherein the conveyance is attached to the acoustic logging tool; and
    an information handling system, wherein the information handling system is configured to:
        identify a cut-off time to be applied to the result signal;
        transform the result signal from a time domain to a frequency domain;
        select one or more modes sensitive to a bonding at the boundary between the casing and the material;
        compute a decay rate of the one or more modes that were selected to find a decay curve; and
        convert the decay curve to a bonding log.

13. The well measurement system of claim 12, wherein the material comprises air, water, borehole fluid, gas, oil, cement, or any combinations thereof.

14. The well measurement system of claim 12, wherein the transmitter is a monopole, a dipole, a quadrupole, a higher azimuthal order source, or a source with an asymmetrical radiation pattern.

15. The well measurement system of claim 14, wherein the information handling system is further configured to decompose the result signal from the transmitter or the receiver.

16. The well measurement system of claim 12, wherein the information handling system is further configured to divide the result signal into one or more early time arrival waveforms and one or more late time arrival waveforms, wherein the result signal is between 20 and 100 kHz.

17. The well measurement system of claim 16, wherein the cut-off time removes the one or more early time arrival waveforms.

18. The well measurement system of claim 12, wherein the information handling system is further configured to apply a filter to the one or more modes to form a filtered signal.

19. The well measurement system of claim 18, wherein the information handling system is further configured to select one or more amplitudes from the filtered signal, wherein the decay rate is computed from the one or more amplitudes, and calculate a decay coefficient by fitting the one or more amplitudes to a decay function or calculating a ratio of the one or more amplitudes from a first time window and a second time window.

20. The well measurement system of claim 12, wherein the information handling system is further configured to decompose the result signal to a time-frequency domain and extracting one or more amplitudes at a selected frequency to identify the decay rate of the selected frequency.

* * * * *